US010298399B2

(12) United States Patent
Kirshenbaum

(10) Patent No.: US 10,298,399 B2
(45) Date of Patent: May 21, 2019

(54) LOCATION-LOCKED DATA

(71) Applicant: HEWLETT PACKARD ENTERPRISE DEVELOPMENT LP, Houston, TX (US)

(72) Inventor: Evan R. Kirshenbaum, Palo Alto, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 185 days.

(21) Appl. No.: 15/500,026

(22) PCT Filed: Jul. 28, 2014

(86) PCT No.: PCT/US2014/048432
§ 371 (c)(1),
(2) Date: Jan. 27, 2017

(87) PCT Pub. No.: WO2016/018217
PCT Pub. Date: Feb. 4, 2016

(65) Prior Publication Data
US 2017/0264438 A1    Sep. 14, 2017

(51) Int. Cl.
H04L 29/06    (2006.01)
G06F 21/00    (2013.01)
(Continued)

(52) U.S. Cl.
CPC .......... H04L 9/3226 (2013.01); H04L 9/0872 (2013.01); H04L 9/0894 (2013.01);
(Continued)

(58) Field of Classification Search
CPC ....... H04L 9/3226; H04L 9/14; H04L 9/0894; H04L 9/0872; H04L 63/107;
(Continued)

(56) References Cited

U.S. PATENT DOCUMENTS 6,317,500 B1    11/2001    Murphy
2008/0226070 A1    9/2008    Herz
(Continued)

FOREIGN PATENT DOCUMENTS

EP    2602955 A1    6/2013
KR    10-20120108266 A    10/2012
(Continued)

OTHER PUBLICATIONS

Denning et al. "A Location Based Encryption Technique and Some of Its Applications", ION NTM 2003, Jan. 22-24, 2003, pp. 1-8. (Year: 2003).*
(Continued)

Primary Examiner — Lisa C Lewis
(74) Attorney, Agent, or Firm — Hewlett Packard Enterprise Patent Department

(57) ABSTRACT

An example method is provided in according with one implementation of the present disclosure. The method includes receiving location-locked data (LLD), receiving at least location information related to a permitted region, and deterministically generating at least one location-specific encryption key (LSK) based at least on the location information related to the permitted region. The method further includes encrypting the LLD such that the encrypted LLD can be decrypted using one of the at least on LSK.

17 Claims, 9 Drawing Sheets

(51) Int. Cl.
*H04L 9/32* (2006.01)
*H04W 12/08* (2009.01)
*H04W 12/02* (2009.01)
*H04L 9/08* (2006.01)
*H04L 9/14* (2006.01)

(52) U.S. Cl.
CPC ............ *H04L 9/14* (2013.01); *H04L 63/0428* (2013.01); *H04L 63/107* (2013.01); *H04W 12/02* (2013.01); *H04W 12/08* (2013.01); *H04L 2209/80* (2013.01)

(58) Field of Classification Search
CPC ........... H04L 63/0428; H04L 2209/80; H04W 12/02; H04W 12/08
See application file for complete search history.

(56) References Cited

U.S. PATENT DOCUMENTS

| | | | | |
|---|---|---|---|---|
| 2011/0032211 | A1* | 2/2011 | Christoffersen | G06F 3/0414 345/174 |
| 2013/0013932 | A1* | 1/2013 | Kong | G06F 21/629 713/189 |
| 2013/0314270 | A1 | 11/2013 | Madsen et al. | |
| 2014/0013443 | A1 | 1/2014 | Jones et al. | |
| 2014/0173443 | A1* | 6/2014 | Hawkins, III | G06F 9/452 715/733 |

FOREIGN PATENT DOCUMENTS

| | | |
|---|---|---|
| KR | 101271488 B2 | 6/2013 |
| WO | WO-2004044670 A2 | 5/2004 |
| WO | WO-2013055037 A1 | 4/2013 |

OTHER PUBLICATIONS

Hsien-Chou Liao and Yun-Hsiang Chao, "A New Data Encryption Algorithm Based on the Location of Mobile Users," Information Technology Journal 7, 2008, pp. 63-69, Asian Network for Scientific Information.

International Search Report and Written Opinion, International Application No. PCT/US2014/048432, dated Apr. 14, 2015, pp. 1-11, KIPO.

Jalal Al-Muhtadi et al., "Context and Location-Aware Encryption for Pervasive Computing Environments," 2006, pp. 1-6, IEEE.

* cited by examiner

LOCATION-LOCKED DATA

BACKGROUND

Electronic devices equipped with a diverse set of functions continue to play an increased role in people's life. These devices can communicate with each other, reach the Internet, print or display different content, perform various tasks, or access data services through networks. Various devices such as personal computers, printers, all in one computing devices, Internet-enabled tablets, laptops, televisions, and gaming consoles have become essential personal accessories, connecting users to friends, work, and entertainment.

DETAILED DESCRIPTION OF SPECIFIC EXAMPLES

Figure 1:
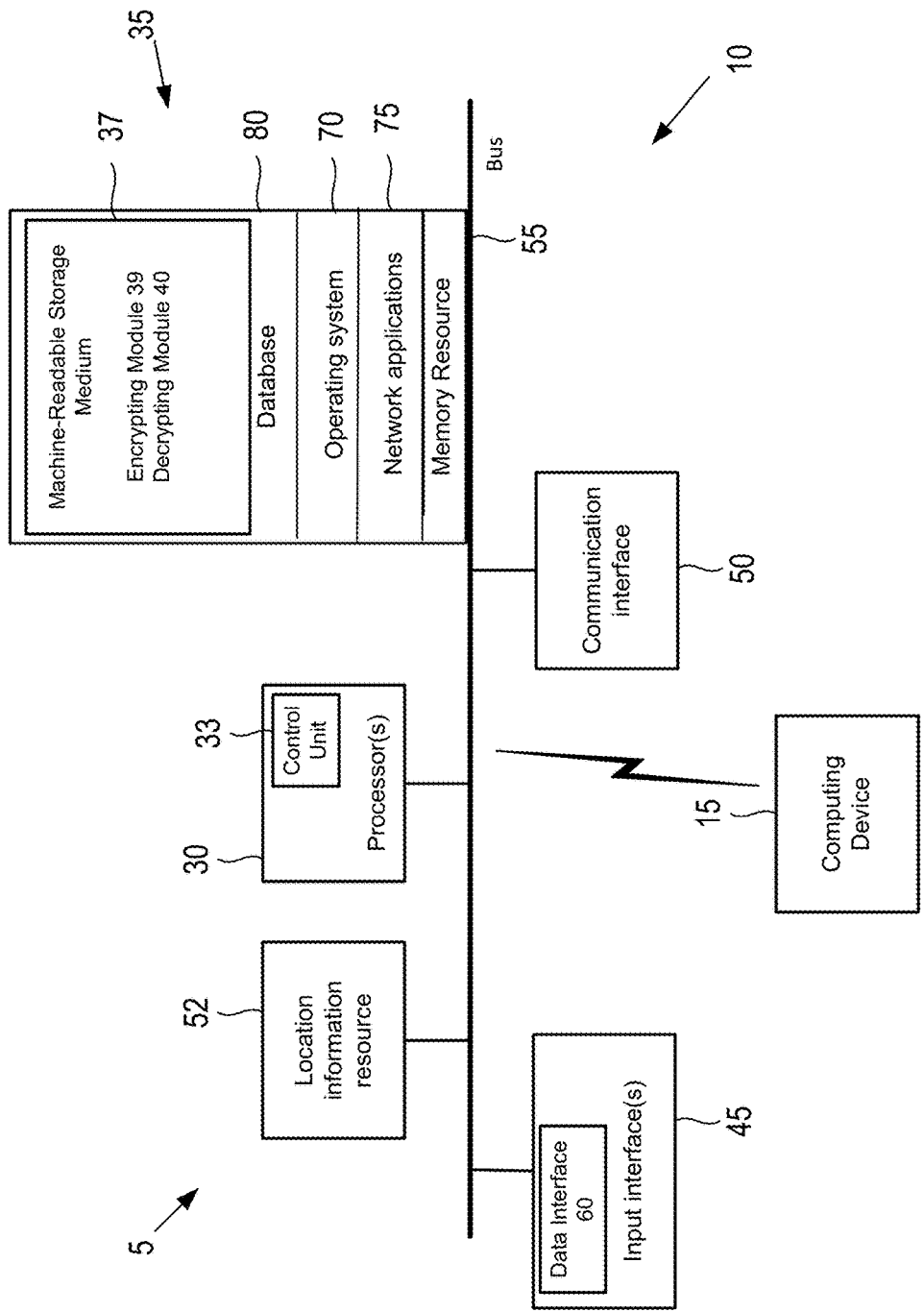
FIG. 1 is a schematic illustration of an example system for encrypting and decrypting location-locked data in accordance with an implementation of the present disclosure.

With the recent improvements in technology, electronic or computing devices continue to play an increasing role in people's life. As used herein, the terms "electronic device," "computing device," and "device" are to be used interchangeably and refer to any one of various personal computers, printers, smartphones, wearable electronic devices, display screens, tablets, personal data assistants (PDA's), laptops, servers, and other similar electronic devices that include a processor and memory.

Computing and electronic devices come in different sizes, forms, and may include different technical features. Different users rely on different type of electronic devices for many day-to-day activities and work related tasks. Due to the proliferation of electronic devices, their technological capabilities are continuously changing and increasing. Consequently, these devices also offer expanded services to their users. These electronic devices are used to access the Internet, communicate with other devices, store and access different types of information, and perform other personal and business related functions.

Most computing devices (e.g., computers, servers, etc.) may store large volumes of data. If a computing device is stolen, lost, or simply disposed of, the information on the computing device may be compromised. Individuals and organizations are becoming increasingly aware of the risk involved due to unintentionally revealing sensitive (e.g., personal or confidential) information when devices containing such information are stolen or improperly disposed of. Organizations now routinely institute policies requiring all of their computers (both mobile and stationary) to use full-disk encryption, requiring a password to be entered (or otherwise obtained) when the computer is powered on before it is possible to access any information on the disk.

In addition, other electronic devices, often unbeknownst to their owners, may also store sensitive information. These include printers, scanners, copiers, fax machines (often bundled together as all-in-one devices), digital video recorders, voicemail systems, routers/modems, and the like, which may have internal storage that maintains temporary copies of data that passes through, often for an indeterminate time. Storage on these devices is typically not encrypted.

When unencrypted devices are disposed of, unless extra steps are taken (as they are typically not outside of corporate settings), the information contained in the storage is accessible to anybody who later comes into possession of the device. This has been demonstrated to be a huge security threat as, for example, in cases of printers thrown out by insurance companies being found to have contained large numbers of recently printed documents including personal health information.

Therefore, many organizations and individuals prefer to use full-disk encryption on all devices. Although helpful, routine full-disk encryption may be burdensome, especially for non-computers and outside of corporate settings. This is largely due to the difficulty and bother of entering decryption passwords every time machines are powered up, which includes power-ups following power failures, when it is desirable that servers and devices like printers and routers resume function without human intervention.

The most common method for providing a decryption password is to prompt a user for it. The problem with this, of course, is that the appropriate user may not be available when the system needs to boot, especially if this happens as the result of a crash or power failure outside of business hours for a system that is supposed to be highly available. This can result in the expense of calling people at home to come in and boot machines and the expense of having them unavailable until they come. It also takes a certain amount of time for the password-knowing user to access each machine that needs to boot (some of the machines may be physically inaccessible or may not have physically attached keyboards or displays), resulting in encryption only being used for those systems considered to be the most critical, leaving others insecure.

Another method for providing the password is to store the password on a detachable device, such as a USB drive, that the system can query on boot. The password can be stored unencrypted or encrypted (with a decryption key supplied in the query by the system). The advantage to this approach is that if the detachable device is removed, as when the system is discarded, the storage is undecryptable. The disadvantage is that if the system is stolen, the detachable device will likely be stolen with it, and the combination of the two is sufficient to gain access to the encrypted data.

A third method for providing the password is to have a server on the network that is capable of responding to queries and providing it. This leaves the system secure if it is stolen or discarded, but it makes the system dependent on both network connectivity and the presence of the password server, which may itself have issues with booting. If the password server is stolen or damaged, no system that depends on it can boot. In a corporate environment, it may be possible to provide extra physical security for the password server, but this sort of thing is unlikely to work in a home environment.

Therefore, available mechanisms for providing a decryption password to computing devices that have been encrypted using full-disk encryption embrace various issues. The present description is directed to methods, systems, and computer readable media for protecting location-locked data (i.e., data that is available/encrypted only at a predetermined location and in association with another predetermined context). Specifically, the present description proposes an approach for encrypting the location-locked, where a processor receives at least location information (e.g., the current location of a device and description of the permitted region) related to a permitted region (e.g., a bounding area of location coordinates), deterministically generates at least one location-specific encryption key (e.g., symmetric key computed based on rounded location context associated with the permitted region) based at least on the location information related to the permitted region, and encrypts the location-locked data such that the encrypted location-locked data can be decrypted using at least the location-specific encryption key. Although, the emphasis in this description is on describing encrypting/decrypting a password for devices that use full-disk encryption, the methods, systems, and computer readable media described herein are applicable to encrypting/descripting any other type of data (e.g., a message, a means for establishing an identity, etc.) based on location information.

In other words, the proposed methods, systems, and computer readable media can be useful in any situation in which it is important that information is only available at or near a particular location. For example, they may be used in door access badges or remote control devices, providing identification information only in the region of the doors they open and being unreadable elsewhere. Further, they may be used as a means of providing secret instructions that only become readable in the location they are to be accessed. In addition, they may be used in two-factor ID tokens that are only useful in certain locations or in a vehicle key that can only be used to start the vehicle in a particular location or set of locations (e.g., as a valet key or for a vehicle that you want anybody to be able to drive but not take off-site or out of a particular area).

In one example, the proposed approach and system encrypt location-locked data such that the resulting encrypted location-locked data can be decrypted within the permitted region using at least one location-specific encryption key. The permitted region is a closed region (or set of closed regions) within a space whose dimensions include location information. This location information may include latitude, longitude, and, optionally, altitude as determinable via receiving signals from GPS satellites, cellular phone towers, stationary beacons, or other means. The location information may also or alternatively include human-defined locations (e.g., rooms, floors, buildings, organizations, campuses, cities, roads, states, and countries) identifiable via signals received from other devices or by means of latitude and longitude information.

Location information may further or alternatively include proximity to a stationary or movable beacon. In, addition, the permitted region may include non-location information such as time of day, date, available wireless networks, the identity (e.g., serial number or MAC address) of a device connected to the system or of devices on connected networks. Because the space containing the permitted region is typically continuous, it may be discretized by rounding each point to a particular resolution, which may be a property of the system, the permitted region, or the request to manage the location-locked data. For example, the resolution might specify that latitude and longitude should be rounded to the nearest 0.001 degree and that time of day should be rounded to the nearest five minutes relative to the top of the hour. The resolution results in a (not necessarily rectangular) grid of "rounded location contexts", with each point in the continuous space mapping deterministically to a single rounded location context.

The location-specific encryption keys may be one of a plurality of symmetric keys computed deterministically based on rounded location contexts associated with the permitted region (e.g., rounded location contexts within the permitted region or just outside of it). Therefore, various data may be encrypted using location sensitive encryption keys. When decrypting that data using the location sensitive keys, the proposed systems and methods can determine whether or not the device storing data is at the correct location and whether any other required context is present in order for the decryption of the location insensitive information to take place.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Furthermore, the term "based on," as used herein, means "based at least in part on." It should also be noted that a plurality of hardware and software based devices, as well as a plurality of different structural components may be used to implement the disclosed methods and devices.

FIG. 1 is a schematic illustration of an example system 5 for encrypting and decrypting location-locked data in accordance with one implementation of the present disclosure. The illustrated system 5 is capable of carrying out the techniques described below. As show in FIG. 1, the system 5 is depicted as including an electronic or computing device 10 to encrypt and decrypt location-locked data from at least one computing device 15 that stores various data. It is to be understood that the techniques described in relation to the device 10 may be implemented with any other electronic/computing device.

For example, the electronic device 10 may be a USB device attachable to a computing device, a card or a chip on the system board embedded in a computing device, a laptop, a personal computer, a tablet, an all in one computing device, a gaming console, a server, a smartphone, a music player, a visual player, a personal digital assistant (PDA), a cellular telephone, an electronic notepad, a plurality of distributed computing devices, or any other suitable computing device that includes a processor. In alternative implementations, the techniques performed by the device 10 could be performed by software modules built into the processor of a computing device that stores information (e.g., the device 15). The computing device 15 may be a printer, a computer, a server, a plurality of distributed computing devices, or any other suitable computing device that includes a processor and memory storing data. In the illustrated example, the electronic device 10 may include at least one processing device 30 (also called a processor), a memory resource 35, input interface(s) 45, a communication interface 50, and a location information resource 52.

In other examples, the electronic device 10 may include additional components and some of the components depicted therein may be removed and/or modified without departing from a scope of the system that allows for carrying out the functionality described herein. It is to be understood that the operations described as being performed by the electronic device 10 that are related to this description may, in some implementations, be performed or distributed between the electronic device 10 and other electronic/computing devices (not shown).

As explained in additional details below, the electronic device 10 may include software, hardware, or a suitable combination thereof configured to enable functionality of the electronic device 10 and to allow it to carry out the techniques described below and to interact with the one or more systems or devices. The electronic device 10 may include communication interfaces (e.g., a Wi-Fi® interface, a Bluetooth® interface, a 3G interface, a 4G interface, a near field communication (NFC) interface, etc.) that are used to connect with other devices/systems and/or to a network (not shown). The network may include any suitable type or configuration of network to allow for communication between the electronic device 10 and any other devices/systems (e.g., other electronic devices, computing devices, displays, etc.).

The processing device 30 of the electronic device 10 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device), the memory resource 35, the input interfaces 45, and the communication interface 50 may be operatively coupled to a bus 55.

The communication interface 50 may allow the electronic device 10 to communicate with plurality of networks, communication links, and external devices. The input interfaces 45 can receive information from devices/systems in communication with the electronic device 10. In one example, the input interfaces 45 include at least a data interface 60 that may receive data from any external device or system (e.g., the computing device 15).

The location information resource 52 may be used to obtain the location of the electronic device 10. In one example, the location information resource 52 may be a receiver (e.g., GPS, cell phone, WiFi, etc.) to provide location information of the device 10. For indoor positioning, receivers listening to stationary beacons (e.g., RF or IR receivers) can be used. In another example, the location information resource 52 may communicate with an external location device to determine or calculate the location information for the device 10. Alternatively, the location information resource 52 may calculate the location information of the device 10 based on various data provided to the device 10.

The processor 30 includes a controller 33 (also called a control unit) and may be implemented using any suitable type of processing system where at least one processor executes computer-readable instructions stored in the memory 35. The processor 30 may independently control a display. In some examples, the processor 30 may receive input from an input device (not shown) or any other computing device/system in communication with the device 10.

The memory resource 35 includes any suitable type, number, and configuration of volatile or non-transitory machine-readable storage media 37 to store instructions and data. Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), magnetoresistive random access memory (MRAM), memristor, flash memory, SD card, floppy disk, compact disc read only memory (CD-ROM), digital video disc read only memory (DVD-ROM), and other suitable magnetic, optical, physical, or electronic memory on which software may be stored. The memory resource 35 may also be used for storing temporary variables or other intermediate information during execution of instructions to by the processor 30.

The memory 35 may also store an operating system 70 and network applications 75. The operating system 70 can be multi-user, multiprocessing, multitasking, multithreading, and real-time. The operating system 70 can also perform basic tasks such as recognizing input from input devices; sending output to output devices; keeping track of files and directories on memory 35; controlling peripheral devices, such as printers, image capture device; and managing traffic on the bus 55. The network applications 75 include various components for establishing and maintaining network connections, such as computer-readable instructions for implementing communication protocols.

The memory 35 may include at least one database 80. In other example implementations, the device 10 may access external database (not shown) that may be stored remotely of the electronic device 10 (e.g., can be accessed via a network or a cloud). The database 80 may store various information related to the device 10, such as data encrypted decryption key records, etc.

Software stored on the non-transitory machine-readable storage media 37 and executed by the processor 30 includes, for example, firmware, applications, program data, filters, rules, program modules, and other executable instructions. The control unit 33 retrieves from the machine-readable storage media 37 and executes, among other things, instructions related to the control processes and methods described herein. In one example, the instructions stored in the non-transitory machine-readable storage media 37 implement at least an encrypting module 39 and a decrypting module 40. In other examples, the instructions can implement more or fewer modules (e.g., various other modules related to the operation of the device 10). In one example, modules 39-40 may be implemented with electronic circuitry used to carry out the functionality described below. As mentioned above, in addition or as an alternative, modules 39-40 may be implemented as a series of instructions encoded on a machine-readable storage medium and executable by a processor. Therefore, as used herein, a module can include program code, e.g., computer executable instructions, hardware, firmware, and/or logic, to perform particular actions, tasks, and functions described in more detail herein in reference to FIGS. 2-7.

As explained in additional detail below, the encrypting module 39 may encrypt location-locked data received from at least one computing device such that the encrypted location-locked data can be decrypted using at least one location-specific encryption key. In one example, the encrypting module 39 may process location-locked data for a computing device and location information related to a permitted region for the device. The module 39 may further construct a location-locked data record (LLDR) including at least the location-locked data, obtain a data encryption key (DEK) and data decryption key (DDK) for the location-locked data, encrypt the location-locked data record (LLDR) using the data encryption key (DEK) to generate an encrypted location-locked data record (ELLDR), and construct a data decryption key record (DDKR) including the data decryption key (DDK).

In addition, the encrypting module 39 may identify a resolution (i.e., a resolution for the particular request to store location-locked data), determine at least a set of rounded location contexts associated with the permitted region based on the resolution and the location information for the permitted region, generate a location-specific encryption key (LSK) for each rounded location context to generate a plurality of location-specific encryption keys, and encrypt the DDKR using at least one LSK to generate at least one encrypted data decryption key record (EDDKR). The EDDKR may be stored on the memory 35 of the device 10.

As explained in additional detail below, the decrypting module 40 may receive current location information for a computing device (e.g., the current position of the device 10), may deterministically generate at least one location-specific encryption key based on at least the current location information, and may use the at least one location-specific encryption key as a decryption key to obtain location-locked data for the computing device. In one example, the decrypting module 40 may identify a resolution, may determine a rounded location context for the electronic device based at least on the current location information and the resolution, and may analyze stored encrypted data decryption key records (EDDKR) to decrypt the location-locked data for the computing device.

With this proposed functionality, a protected device (e.g., the computing device 15) may use full-disk encryption, may be able to boot autonomously without requiring input from a user or any other device on the network, and would not be at risk of divulging its information if it were removed from its normal location. There is no need that a human enters a password every time the device boots or that a password is stored on an attached external device that connects to a port (which may be stolen with the protected device). Therefore, an owner of the device does not need to worry about the data stored on the device if the device is stolen or disposed of.

Figure 2:
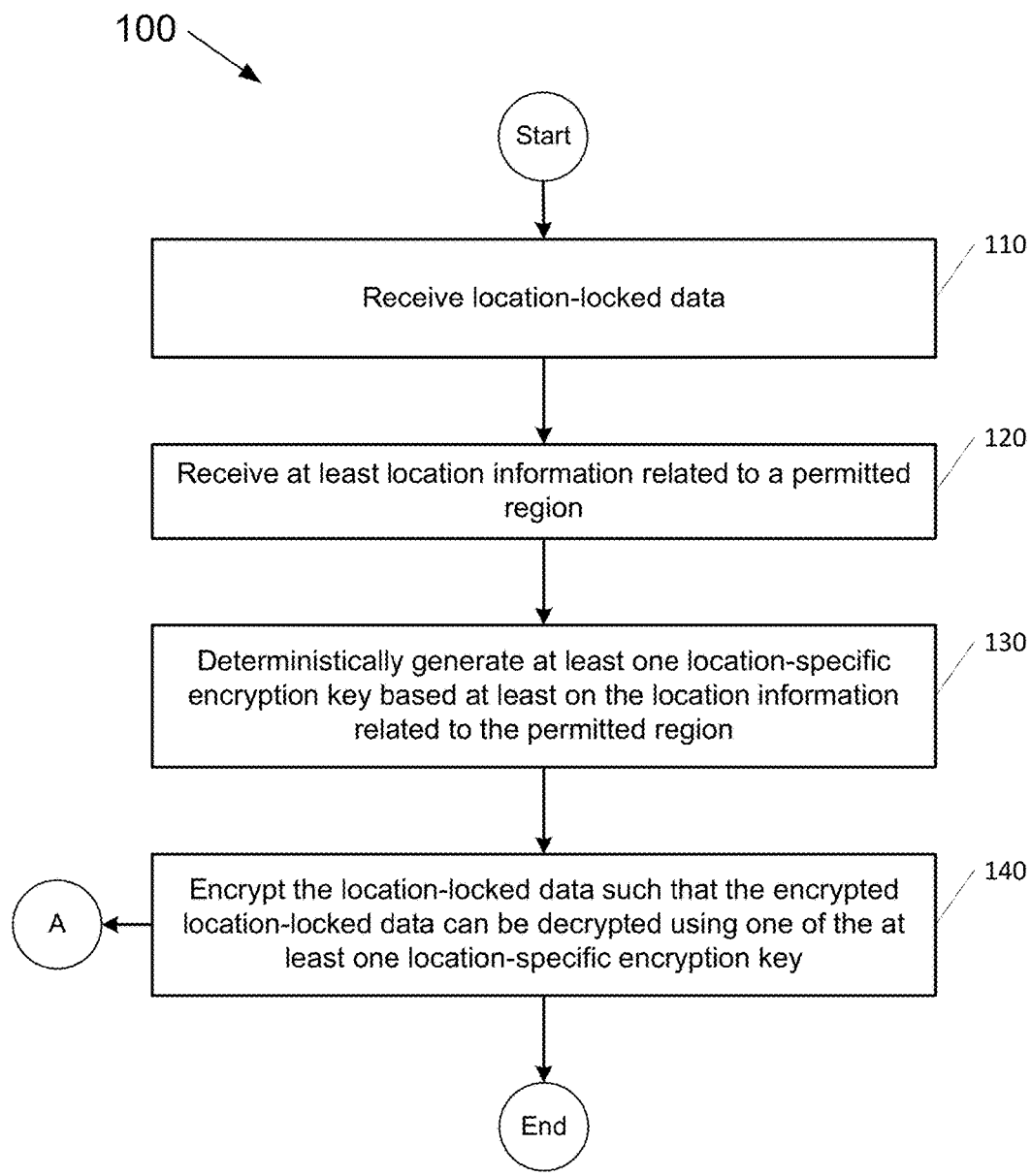
FIG. 2 illustrates a flow chart showing an example of a method for encrypting location-locked data in accordance with an implementation of the present disclosure.

FIG. 2 illustrates a flow chart showing an example of a method 100 for encrypting location-locked data. In one example, the method 100 can be executed by the control unit 33 of the processor 30 of the electronic device 10. Various elements or blocks described herein with respect to the method 100 are capable of being executed simultaneously, in parallel, or in an order that differs from the illustrated serial manner of execution. The method 100 is also capable of being executed using additional or fewer elements than are shown in the illustrated examples.

The method 100 may be executed in the form of instructions that may be encoded on a non-transitory machine-readable storage medium 37 executable by the processor 30 of the electronic device 10. In one example, the instructions for the method 100 implement the encrypting module 39. In other examples, the execution of the method 100 may be distributed between the processing device 30 and other processing devices in communication with the processing device 30. In yet another example, the method 100 may be executed on another computing device connected to the electronic device 10 or on several computing devices.

The method 100 begins at block 110, where the processor 30 receives location-locked data (LLD) from a computing device (e.g., the device 15). As mentioned above, the LLD may include a decrypting password or storage encrypting key used to gain access to a computing device (e.g., the device 15) that uses full-disk encryption, or any other type of data that is to be encrypted/decrypted based on a particular context where that context includes at least a location or a region. It is to be understood that the LLD or any other data received from the device 15 may or may not be generated by the device 15. As explained in additional details below, computing device 15 may or may not be the same device that requests decryption of the LLD.

At 120, the control unit 33 receives at least location information related to a permitted region (PR) of at least one computing device (e.g., the device 15). The location information may include at least the current location of the computing device 15 and a description of the permitted region. In one example, the location information of the device 15 may be received from a GPS device incorporated in the electronic device 10 or the computing device 15. In another example, the device 10 or the device 15 may communicate with an external GPS device to determine or calculate the location information.

The permitted region related to the device 15 is an area in relation to which the LLD of the device 15 may be encrypted and decrypted (i.e., the area in which the electronic device 10 is permitted to respond). The permitted region may be specified as a bounding area of location coordinates, by a radius around the current location of the device 15, or in other ways. The permitted region may be predefined, entered by a user, or may be determined/calculated by the control unit 33 based on the location of the device 15 and other perimeters (e.g., user preferences, etc.). In some examples, obtaining the permitted region may require the electronic device 10 (or the computing device 15 to which the device 10 is attached to) to contact a server over a network to compute the permitted region based on information received (e.g., "Room 502 in Hotel ABC", "HP Palo Alto campus" or "Santa Clara County").

In alternative examples, in addition to the location information and the permitted region, the electronic device 10 may receive additional context information related to the permitted region and to the computing device 15. The additional context information may include time of day information, service set identifier (SSID) information (e.g., for a wireless network to which the device is 15 is connected), beacon value information (e.g., for a nearby beacon), media access control (MAC) address or serial number for the computing device 15, challenge information related to the encryption/decryption process, and other types of information. Some of the received context information may allow multiple values or regions of continuous spaces (e.g. "any of these SSIDs" or "Between 8:00 am and 7:00 pm").

Challenge information may be used when the device requesting decryption might be required to prove that it is authorized to do so. An example way of doing this is to establish at least one challenge token (e.g., a number or string, etc.), either generated by the encryption device 10 or passed in by the device 15 providing the LLD and include that token as part of the information that is used to generate the LSK location-specific encryption key (LSK). In other examples, there might be multiple such tokens for the decrypting request. That way, unless the decryption request includes at least one token, a correct LSK can't be generated. The advantage of this process is that if the encryption device 10 is detached from the device it's protecting (e.g., the device 15), it becomes impossible to obtain the LLD by attaching the encryption device 10 to another device in the same location or by opening it up and examining the memory, even if one can guess a location in the permitted region.

Next, the control unit 33 deterministically generates at least one location-specific encryption key based at least on the location information related to the permitted region (at 130). As used herein, the term "deterministically" refers to the doctrine that everything generated, computed, etc. is the necessary result of a sequence of causes. In other words, performing a computation or generating an outcome based on the same input guarantees receiving the same result. In some examples, multiple location-specific encryption key are generated. As explained in additional detail below, the location-specific encryption keys may be computed based on rounded location context(s) associated with the permitted region, where the rounded location context(s) are determined based on a resolution, location information for the permitted region, and any other additional context information related to the permitted region and to the computing device 15. At 140, the control unit 33 encrypts the location-locked data such that the encrypted location-locked data can be decrypted using one of the at least one location-specific encryption key. In other words, the location-locked data is locked to a particular context that includes a notion of being at a specific location or within a predetermined region. As explained in additional details below, the location-locked data may be encrypted using a plurality of location-specific encryption keys such that any one of the keys may be used later on in order to decrypt.

Figure 3:
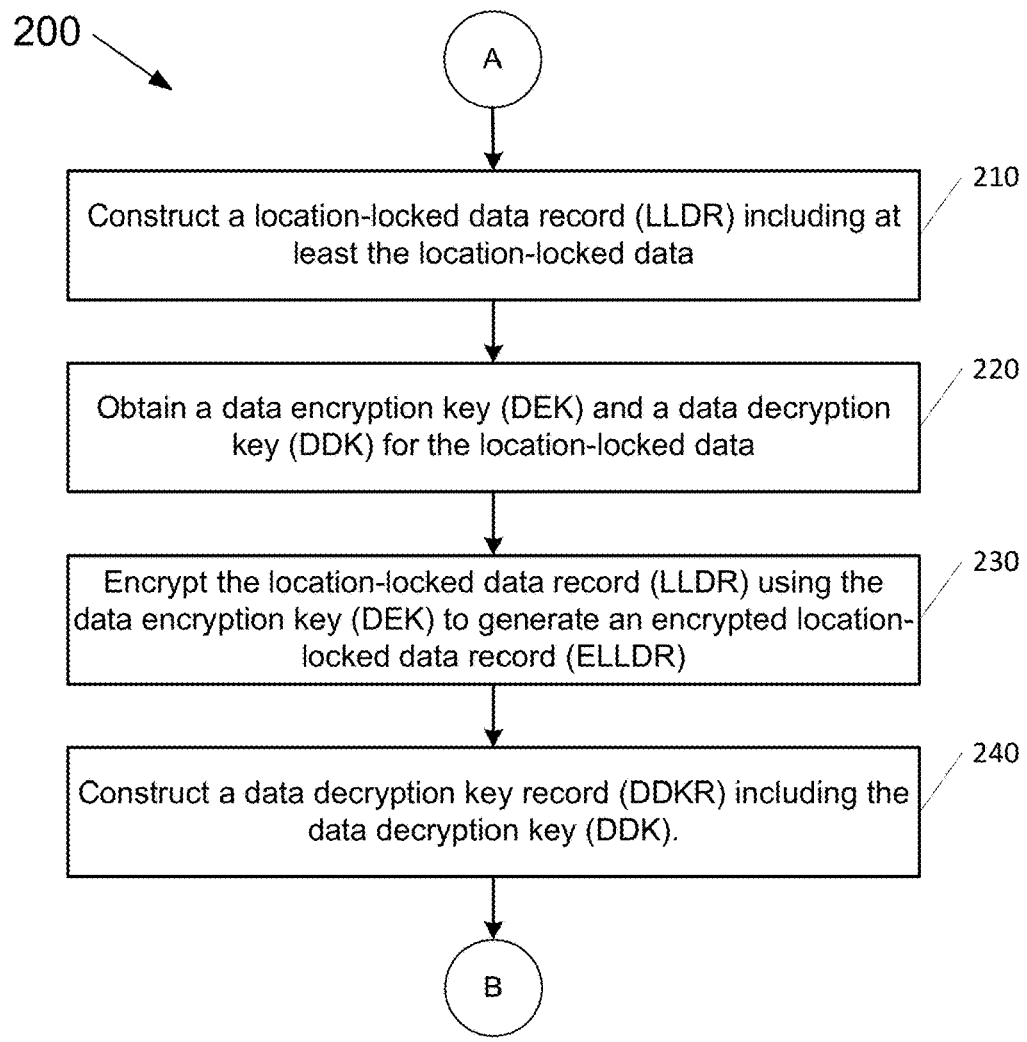
FIGS. 3-4, collectively, illustrate a flow chart showing details of a method for encrypting location-locked data in accordance with an example implementation of the present disclosure.
Figure 4:
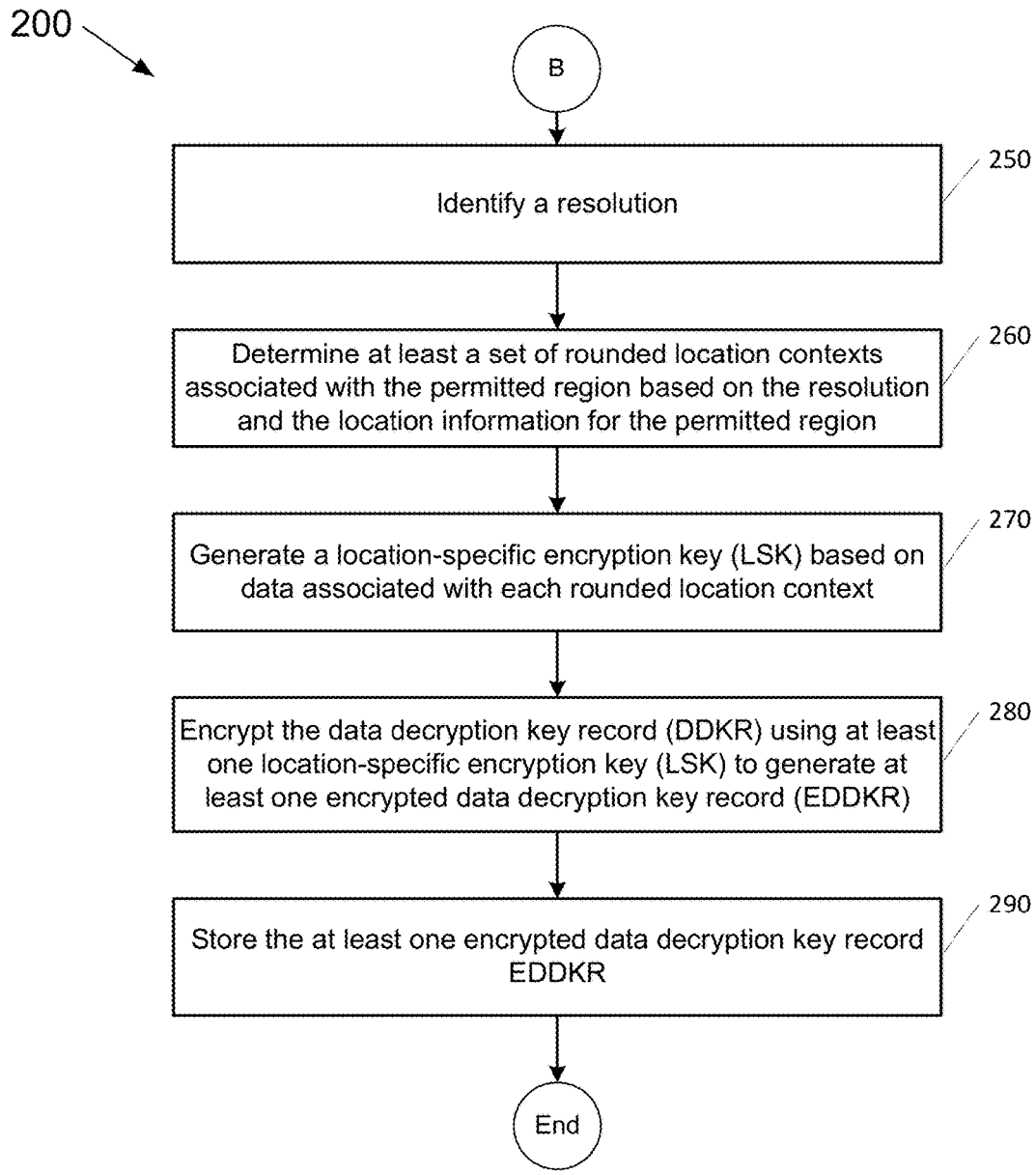

FIGS. 3-4, collectively, illustrate a flow chart showing details of a method 200 for encrypting location-locked data in accordance with an example implementation of the present disclosure. The method 200 may be executed in the form of instructions encoded on a non-transitory machine-readable storage medium 37 executable by the processor 30 of the electronic device 10. In one example, the instructions for the method 200 implement the encrypting module 39. Various elements or blocks described herein with respect to the method 200 are capable of being executed simultaneously, in parallel, or in an order that differs from the illustrated serial manner of execution.

At 210 the control unit 33 constructs a location-locked data record (LLDR) that includes at least the location-locked data (LLD) received by the electronic device 10. In addition, the control unit 33 may generate a location-locked data blinding factor (LLDBF) (e.g., a randomly-generated or otherwise non-repeated number or other similar data) and a deterministic location-locked data recognition token (LLDRT) included in the LLDR. In some examples, the LLDRT may be a block of data that is large enough to be unlikely to arise by chance but which is easily recognized. For example, the LLDRT may be a block of eight zero bytes or it may be a hash of the LLD.

At 220, the control unit 33 obtains data encryption key (DEK) and data decryption key (DDK) for the LLD. In some examples, the DEK and the DDK are randomly generated or provided keys (or a single key) used to encrypt the LLD. If symmetric encryption is used, one key is obtained and that key acts as both DEK and DDK. With asymmetric encryption, two keys (DEK and DDK) are obtained from the control unit and they work together, one decrypting what the other encrypts.

Next, the control unit 33 encrypts the LLDR using the DEK to generate an encrypted location-locked data record (ELLDR) (at 230). At this point, the location-locked data and DEK may be discarded and steps may be taken (e.g., by overwriting the memory with random bits) to ensure that even inspection of the memory of the device will not allow them to be recovered. If this is done, the LLD may only be obtained by the control unit 33 by decrypting the ELLDR, and this requires knowledge of the DDK.

At 240, the control unit 33 constructs a data decryption key record (DDKR) including the DDK. In addition, the control unit 33 may generate a data decryption key blinding factor (DDKBF) (e.g., randomly-generated or otherwise non-repeated number or other similar data) and a deterministic data decryption key (DDK) recognition token (DDKRT) included in the DDKR.

The control unit 33 then identifies a resolution (i.e., rounding resolution) (at 250). As used herein, the terms "resolution" or "rounding resolution" may refer to discretization of space, a way of taking any arbitrary point in the continuous (in at least some dimensions) space and mapping it deterministically to a rounded location context. The rounding resolution may be a property of the system (e.g., the device 10), the permitted region, or the request to manage the LLD. In one example, the resolution may be related to the tradeoff between the amount of data that would need to be stored (i.e., the number of EDDKRs corresponding to rounded location contexts associated with rounded location contexts associated with the permitted region) and the tolerance for false positives and false negatives. In other examples, the resolution may be defined as part of the design of the system 5.

In other words, resolution may be the size of identified sub-regions (e.g., having rectangular, triangular, hexagonal, etc. form) that are used to determine rounded location contexts within the permitted region (and outside that region) in order to generate location-specific encryption keys. The size of the sub-regions may vary. In some examples, the edges of the sub-regions may be every six inches, every five feet, every half mile, etc. The goal is to identify rounded location contexts associated with the permitted region, using at least the sub-regions in order to minimize either the likelihood that a location within the permitted region will not map to a rounded location not included in the permitted region or that a location outside the permitted region will not map to a rounded location inside the permitted region. As explained in additional details below, the rounded location contexts may include additional context information in addition to the sub-regions.

In one example, the resolution may be predefined (e.g., as a function of the device 15) or may be specified by a user. In another example, the resolution may be computed automatically based on the current location of the device 15 and the size of the permitted region to minimize false positives and false negatives while also minimizing the number of location-specific encryption keys that need to be computed. In addition, the resolution may be stored at the memory of the device 15, the device 10, or it may be obtained by using other means. The resolution may have multiple values corresponding to multiple dimensions (e.g., for latitude, longitude, altitude, time of day, etc.) and it may specify fixed reference points relative to which rounded location contexts may be determined. For example, the resolution may be stored in terms of fractions of a degree of latitude and longitude (either the same fraction or as separate numbers, possibly along with an actual distance above sea level). As an alternative example, the latitude and longitude resolution may be specified as a particular number of feet, meters, miles or kilometers relative to a defined fixed point such as the nearest integral degree of latitude and longitude, to avoid distortion due to the curvature of the earth.

At 260, the control unit 33 determines at least a set of rounded location contexts associated with the permitted region based on the resolution and the location information for the permitted region. As explained in additional detail below, the rounded location contexts may be used to generate location-specific encryption keys (LSK) to encrypt the data decryption key record (DDKR). In one example, the rounded location contexts may further include additional context information (e.g. any other information that needs to pertain to the encryption/decryption request in order for it to succeed). For instance, the control unit 33 may identify additional context information used to encrypt the DDKR. In one example implementation, when the control unit 33 receives the location information for the computing device 15, the control unit may identify the sub-region in which the device 15 is located. The control unit may use the actual position (or some other identifier, such as a row and column number) of the center of the sub-region or may determine the closest corner and use the position and identifier of that as the rounded location. Consequently, all rounded location contexts for the permitted region are determined.

Next, for each rounded location context associated with the permitted region, the control unit 33 performs the steps described in 270-290. At 270, the control unit 33 generates a location-specific encryption key (LSK) based on data associated with each rounded location context. When there are multiple rounded location contexts, the control unit may generate a plurality of LSKs. When there is only one rounded location context, the control unit may generate only one LSK. Thus, when a request for the data is received, the data may be decrypted using one of the at least one LSK (i.e., any of the keys). In one example, each LSK may be computed deterministically based on a rounded location context. In alternative examples, the set of rounded location contexts is determined using at least a portion of the additional context information (e.g., time of day information, service set identifier (SSID) information, beacon value information, media access control (MAC) address information, serial number information, and challenge information, etc.). In other words, each LSK may be generated using the rounded location context that includes location (i.e., permitted region data) and at least a portion of the additional context information.

While the data decryption key (DDK) may be random, the LSK may be deterministic based on the rounded location context used to generate it. In other words, if the LSK is computed in the same context, (e.g., rounded location context including additional context information), the control unit may retrieve the same value. In some examples, each LSK is generated by computing a hash function of data associated with each rounded location context (e.g., a cryptographic hash of a tuple including data, in a standard format, describing all necessary context information necessary to uniquely identify the rounded location context). A cryptographic hash function, also known as a message digest algorithm, is an algorithm that deterministically maps data objects to hash values, also known as message digests, having the property that it is exceedingly unlikely that two non-identical data objects will map onto the same hash value. Examples of cryptographic hash functions are the various Secure Hash Algorithms (e.g., SHA-1, SHA-2, etc.), the Message Digest algorithms (e.g., MD4, MD5, etc.), and the Digital Signature Algorithm.

At 280, the control unit 33 encrypts the data decryption key record (DDKR) using at least one location-specific encryption key (LSK) to generate at least one encrypted data decryption key record (EDDKR). When a plurality of LSKs are used, the control unit may generate a plurality of corresponding EDDKRs. In other words, the DDKR is encrypted using at least one LSK. When more than one rounded location contexts exist, and consequently a plurality of LSKs are generated, the control unit encrypts the DDKR using all available LSKs. The control unit then stores the at least one EDDKR (e.g., in the memory 80 or another external/internal memory) (at 290).

After the EDDKRs are generated and stored, the LSKs may be deleted or otherwise erased by the control unit. As explained in additional details below, the location-locked data may only be recovered by regenerating at least one LSK previously used to encrypt the DDKR and create an EDDKR.

Figure 5:
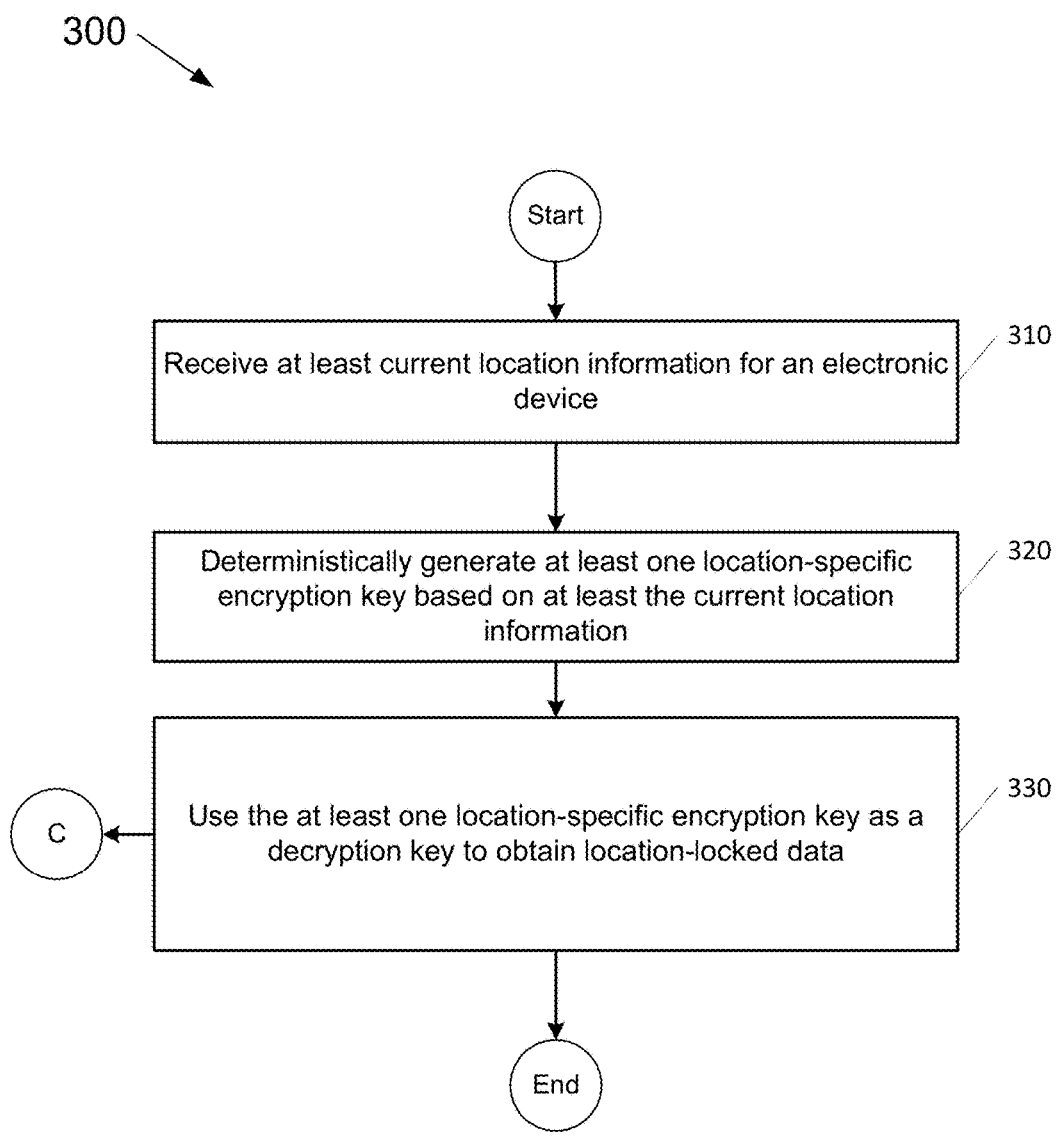
FIG. 5 illustrates a flow chart showing an example of a method for decrypting and obtaining location-locked data in accordance with an implementation of the present disclosure.

FIG. 5 illustrates a flow chart an example method 300 for decrypting and obtaining location-locked data in accordance with an example implementation of the present disclosure. The method 300 may be executed in the form of instructions encoded on a non-transitory machine-readable storage medium 37 executable by the processor 30 of the electronic device 10. In one example, the instructions for the method 300 implement the decrypting module 40. Various elements or blocks described herein with respect to the method 300 are capable of being executed simultaneously, in parallel, or in an order that differs from the illustrated serial manner of execution.

The method 300 begins at 310, where the control unit 33 of the device 10 receives at least current location information for an electronic device (e.g., the device 10). In one example, the current location information includes the specific location of the device 10. In some example implementations, the location of the device 10 may be used as a proxy for the location of the device making the retrieval request or even some other device (or person, or object) identified in the request to store the location-locked data (LLD) or the request to retrieve the LLD. Any other information that may be used to identify the location of the devices 10 or 15 or another device or person or object may also be received and processed by the control unit. The information in block 300 may be received after a request for LLD received at the computing device 15 (e.g., request for a password during a reboot of a computing device encrypted using full-disk encryption, a password request, etc.). In other words, what is requested to be returned is the location-locked data, which is encrypted but which will be decrypted before being returned. The request may be provided by a requestor (e.g., a person, a device, etc.). In some examples, the location information includes the location of the requestor or the location of an entity (e.g., a person, a device, etc.) identified in a request to retrieve location-locked data or in the request to store location-locked data. It is to be understood that the request for the LLD may or may not be received from the device that initially provided LLD to be encrypted.

In one example, the control unit may receive GPS coordinates of the device 10 from a GPS device integrated in the device 10 (e.g., location information resource 52), on the device 15, or by any other reasonable means for receiving location. In another implementation, the control unit may also receive any additional context information that may be required to decrypt the location-locked data. The additional context information may be related to the permitted region and to the computing device and may including at least one of: time of day information, service set identifier (SSID) information, beacon value information, media access control (MAC) address information, serial number information, challenge information, and other types of information.

At 320, the control unit deterministically generates at least one LSK (i.e., decrypting LSK) based on at least the current location information. At 330, the control unit 33 uses the at least one LSK as a decryption key to obtain location-locked data (e.g., associated with the computing device 15). As explained in additional detail below in relation to FIGS. 6-7, the decrypting module 40 may identify a resolution for the device 16, may determine a rounded location context for the computing device based at least on the current location information and the resolution, and may analyze stored encrypted data decryption key records (EDDKR) to decrypt the location-locked data for the computing device.

Figure 6:
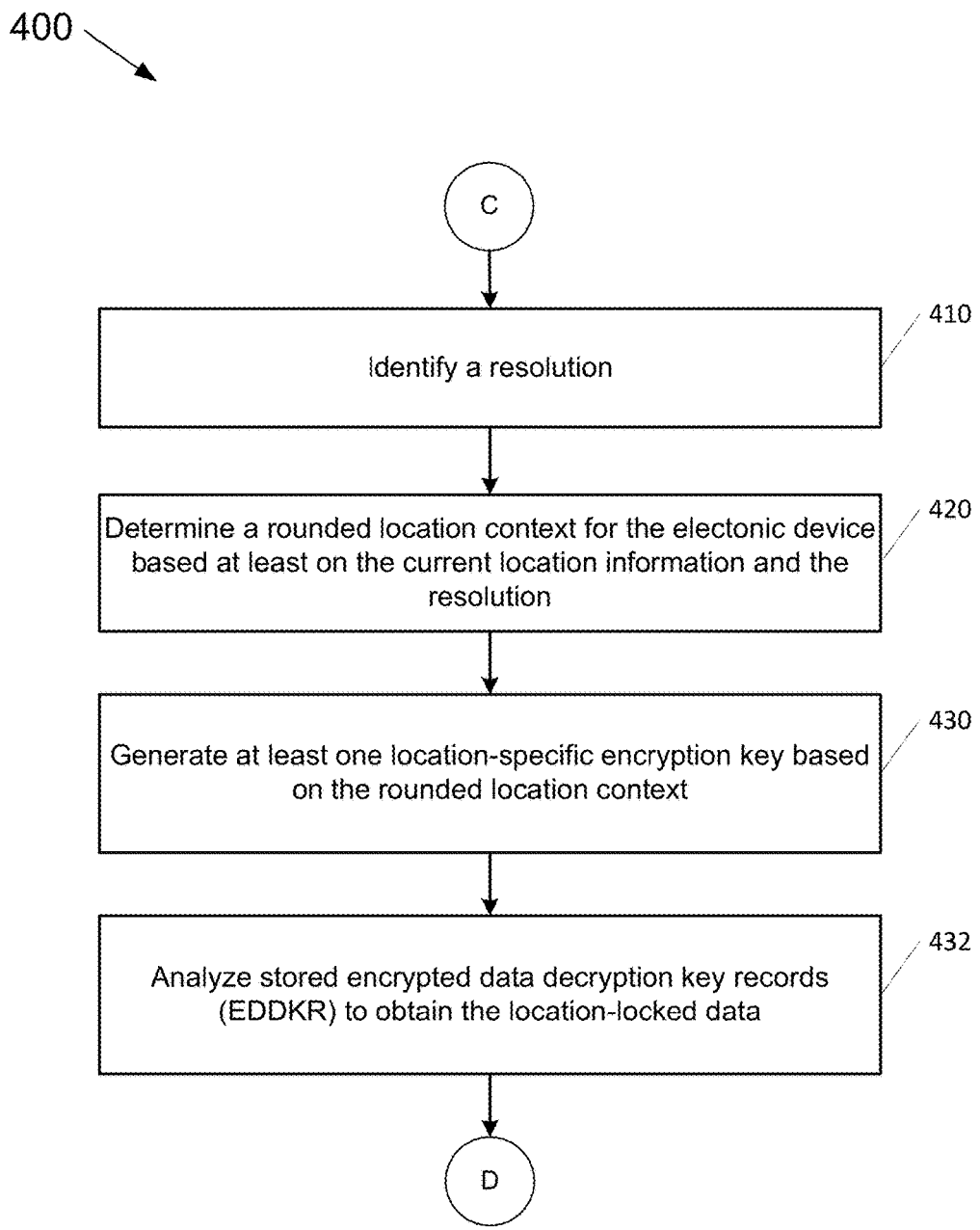
FIGS. 6-7, collectively, illustrate a flow chart showing details of a method for decrypting location-locked data in accordance with an example implementation of the present disclosure.
Figure 7:
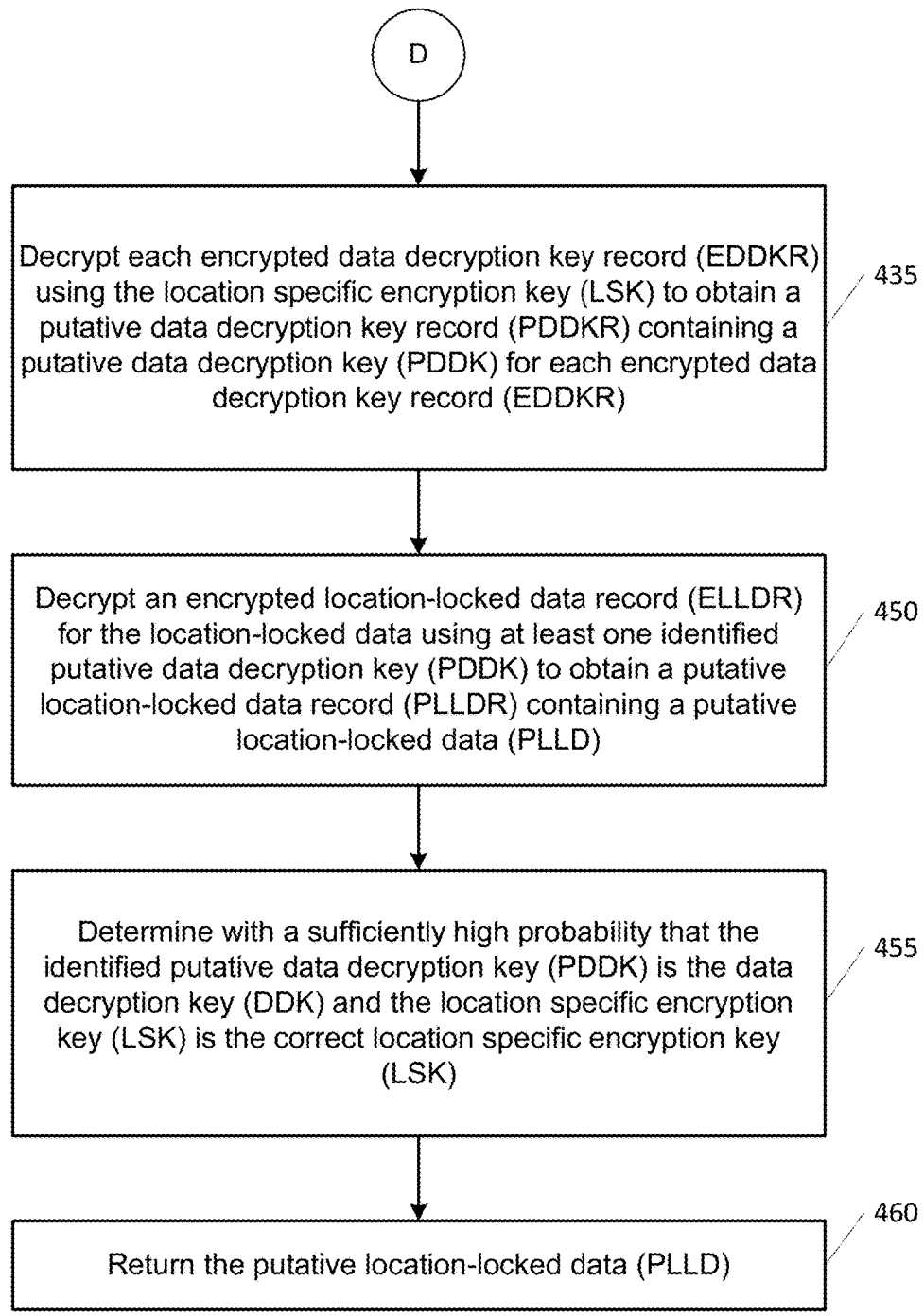

FIGS. 6-7, collectively, illustrate a flow chart showing details of a method 400 for decrypting location-locked data in accordance with an example implementation of the present disclosure. The method 400 may be executed in the form of instructions encoded on a non-transitory machine-readable storage medium 37 executable by the processor 30 of the electronic device 10. In one example, the instructions for the method 400 implement the encrypting module 39.

At 410 the control unit 33 identifies a resolution for the particular request to decrypt location-locked data. As explained in additional details above, the resolution may be the size of identified sub-regions that are used to determine rounded locations associated with the permitted region. The resolution may be predetermined (e.g., stored in memory of the device 15 or the device 10), may be specified by a user, may be computed automatically based on the current location of the device 15 and the size of the permitted region. Other techniques for identifying a resolution may also be used.

Next, the control unit determines a rounded location context (i.e., a decrypting rounded location context) for the device 10 based at least on the current location information and the resolution (at 420). Alternatively, the rounded location context may be determined for some other entity (e.g., the device 15, etc.). In one example, the control unit 33 uses the current location information of the device 10, the resolution, and determines a sub-region in which the device 10 is located. That sub-region may be identified as the rounded location context of the device 10. As mentioned above, the control unit 33 may use the actual position (or some other identifier, such as a row and column number) of the center of the sub-region or may determine the closest corner and use the position and identifier of that as the rounded location. The decrypting rounded location context may or may not be in the permitted region that was used to encrypt the location-locked data. Alternatively, the control unit 33 may compute or determine the rounded location context using additional context information (e.g., the context information described above—time of day, SSID, MAC address, etc.).

At 430, the control unit generates at least one location-specific encryption key (LSK) (i.e., a decrypting LSK) based on the rounded location context. In one example, the control unit generates a LSK by computing a hash value of the rounded location context using the same hash function and data representation described in block 270 of method 200 as described above with respect to FIG. 4. At 432, the control 33 analyzes the previously generated and stored encrypted data decryption key records (EDDKR) to obtain the location-locked data.

At 435, the control unit 33 attempts to decrypt each encrypted data decryption key record (EDDKR) using the LSK to obtain a putative data decryption key record (PDDKR) containing a putative data decryption key (PDDK) for each encrypted data decryption key record (EDDKR). Decrypting each EDDKR means that the control unit may not decrypt all EDDKRs, but may stop when it finds a match and may skip some EDDKRs if it has means to determine that decrypting them is unlikely to satisfy the request. In one example, the control unit may use a putative data decryption key recognition token (PDDKRT) to determine that the LSK was likely to be the same one that was used to encrypt the DDKR to produce a particular EDDKR. In other words, if the LSK was the one that was originally used to encrypt the DDKR to form this particular EDDKR, then the result of the decryption will be that the PDDKR will be the DDKR and, therefore, the PDDK will be the DDK and the PDDKRT will be the DDKRT. If the PDDKRT is not equal to what the DDKRT would have been, this is not the correct LSK and, therefore, the PDDK is not the DDK needed, so the control unit checks the next EDDKR. As a result, the control unit may identify at least one putative data decryption key recognition token (PDDKRT) that is likely to match a data decryption key recognition token (DDKRT) for the location-locked data. If a recognition token is not included in the DDKR, the control unit may simply proceed to the next step.

In some examples the processes in blocks 435-455 are performed for each EDDKR. However, the processing may be stopped for a given EDDKR when it is determined (based on the PDDKRT or the PLLDRT) that the LSK was the wrong key for that EDDKR. Also, the processes in blocks 435-455 may terminate as soon as one EDDKR is processed successfully all the way through block 455.

At 450, the control unit decrypts an encrypted location-locked data record (ELLDR) for the location-locked data using at least one identified putative identified data decryption key (PDDK) to obtain a putative location-locked data record (PLLDR) containing a putative location-locked data (PLLD). For example, for the examined EDDKR, the control unit identifies at least one putative data decryption key (PDDK) that is likely to match a data decryption key (DDK) for the location-locked data (at 445). In one implementation, the control unit may use a putative location-locked data recognition token (PLLDRT). In other words, when the control unit 33 establishes that it is very likely that the PDDK is the DDK, it uses it to decrypt the ELLDR to obtain a PLLDR containing a PLLD and a PLLDRT. If this PDDK was the DDK, the PLLD will be the LLD and the PLLDRT will be the LLDRT. If not, they will be different.

At 455, the control unit determines with a sufficiently high probability that the identified PDDK is the DDK and the LSK is the correct LSK. In other words, the control unit may not determine what the actual probability is, but it may simply determine that is satisfied that the probability is sufficiently high. In one implementation, the control unit attempts to disconfirm that the identified PDDK is the DDK and the LSK is the correct LSK, and the confirmation in 455 is the failure to disconfirm. For example, the control unit may determine whether the PLLDRT matches a location-locked data recognition token (LLDRT) for the location-locked data. To perform this check the LLDRT may be assumed to be well-known or computable from the LLD. In other words, the control unit 33 checks whether the PLLDRT is equal to what the LLDRT would have been (perhaps under the assumption that the PLLD is equal to the LLD). If it is not, then the PDDK is not the DDK, and so the LSK was not the correct one (even though it passed the first test). In that case, the control unit 33 checks the next EDDKR.

If the PLLDRT is equal to what the LLDRT would have been, the control unit 33 determines with sufficiently high probability that the putative location-locked data (PLLD) is, in fact, the location-locked data and returns the PLLD as the requested LLD (at 460). Alternatively, the PLLD may be added to a list of values to return and the control unit may proceed to check the next EDDKR. At the end, the control unit may return multiple PLLDs that passed both tests as possible LLD values, leaving the task of deciding which, if any, is the correct one to the requestor. For example, if the requestor asked for LLD which represent a disk decryption password and the control unit 33 returns three possible values, the requestor might try to use each of the values as the password in hopes of one succeeding (note that with the use of recognition tokens, such a situation would be very unlikely).

If all EDDKRs are considered and no PLLD is found that is considered likely to be the LLD, the control unit 33 may indicate that the current rounded location context of the device 10 does not appear to be one that was in the original permitted region, and it cannot determine and return the location-locked data. That way, any data for a device may be protected based at least on predetermined location and other context information. In one example, the requestor may be able to specify whether it desires to receive the first likely response or all likely responses. In such implementation, the requestor could use the "all likely responses" only in the situation in which the first likely response was used unsuccessfully. In an alternative implementation, the requestor may be able to specify whether it desires to receive the first likely response or the next likely response. In such implementation, when the next likely response is desired, in method 400 beginning with block 435, the control unit 33 may ignore any EDDKRs that had been considered since the last time it was asked for the first likely response.

A similar approach may be used to allow for more than one permitted region to be specified. This may be applicable in a situation where a relatively stationary device/system spends part of its time in one location and part of its time in others (e.g., an encrypted computer which may boot in its owner's office or in its owner's house). In order to implement this, in one example, multiple permitted regions may be considered to be a single discontiguous permitted region containing both all permitted regions as permitted sub-regions and the set of rounded location contexts associated with the discontiguous permitted region may be computed as the union (or other combination) of the rounded location contexts associated with each permitted sub-region. In another example, the multiple permitted regions may be associated with different resolutions and/or different context dimensions. For example, one permitted region may be associated with a latitude and longitude resolution of several tens of feet, to allow the LLD to be received anywhere on a large campus, while another may be associated with a latitude and longitude resolution of one foot or less, to allow the LLD to be received within a particular room away from that campus. Alternatively, one permitted region may be associated with latitude and longitude position, while another may be associated with the relative position expressed by the distance between the computing device and some beacon (e.g., the LLD may be divulged if within 20 feet of its owner's cell phone, as established by Bluetooth communication, allowing off-campus booting when its owner is nearby).

In this example, the LSKs generated at 270 and 430 may be based on different data for different permitted sub-regions, and it may be advantageous to associate with each EDDKR an unencrypted indication of the resolution and/or dimensions used to generate its LSK. As an alternative, no such indication may be associated with each EDDKR, but an indication for each distinct resolution and/or set of dimensions used may be stored. In such an example, in method 300, at 320, multiple LSKs are generated, one per indication, and block 330 is used to look at each EDDKR (at 435 through 460). In another example, each permitted sub-region may be associated with a different pair of DEK and DDK. In this example, each DEK is used at 230 to generate an ELLDR and each DDK is used at 240 to construct a DDKR including the DDK and, optionally, an indication of the corresponding ELLDR. If present, this indication may be used at 450 to determine which ELLDR to attempt to decrypt. If absent, the control unit 33 may attempt to decrypt all ELLDRs.

The proposed techniques may also be used to store multiple instances of location-locked data (e.g., multiple passwords for systems that have separate passwords for each attached disk). In such a case, while encrypting, the control unit may receive a discriminator key corresponding to the location-locked data (i.e., each instance of location-locked data may be associated with a discriminator key). The control unit may then use the discriminator key to decrypt the location-locked data when multiple instances of location-locked data are received. In other words, the decrypting request may supply a discriminator key that specifies which location-locked data (e.g., passwords) is desired. The device 10 may contain a table mapping discriminator keys (or, alternatively, a cryptographic hash of the discriminator keys) to the ELLDRs associated with each instance of location-locked data, and the decryption process 400 may consider only those ELLDRs associated with the discriminator key provided in the retrieval request. Alternatively, all ELLDRs associated with all discriminator keys may be kept on the same list.

In some examples, the location-specific encryption keys (LSK) generated at 270 and 430 may be further based on the provided discriminator key, as by considering it to be part of each rounded location context at 270 and the rounded location context at 430. This ensures that the decryption at 435 cannot succeed in the absence of the discriminator key used to construct a given EDDKR. In an alternative example, the discriminator key is not used to generate the LSK, but rather it (or a cryptographic hash of it) is stored as part of the DDKR and/or LLDR, possibly as the DDKRT or LLDRT. In such an example, the control unit 33, when determining whether or not a given PDDKR or PLLDR is likely to be a correct decryption may compare the values found with the proffered discriminator key (or its hash). In another example, there is a single ELLDR for each rounded location context, where the LSK is not generated based on the discriminator key. In this example, each LLDR contains a mapping from discriminator key (or cryptographic hash of discriminator key) to the corresponding LLD.

On retrieval, an appropriate LLDR is found and the discriminator key is used to extract the correct LLD or to determine that no LLD associated with that discriminator key is to be divulged in the current rounded location context. On storage, for each rounded location context in the permitted region, the control unit 33 first checks to find if there is an LLDR that is findable at that rounded location context. If so, it constructs a new LLDR whose map contains a new association between the proffered discriminator key and the LLD being stored. If not, it constructs a new LLDR whose map contains only such an association. Existing method or techniques may be used to ensure that if the same existing ELLDR is augmented more than once the result will be the same new ELLDR and to ensure that when no further EDDKRs refer to a given ELLDR it is deleted.

To further secure the operation of the proposed electronic device 10 and the encryption/decryption process, the device 10 may be constructed in such a way that if it should be physically opened, its memory is erased or otherwise rendered unreadable (e.g., by physically destroying it using an explosive charge or a capacitative discharge, by melting it with stored corrosive, etc.).

Figure 8:
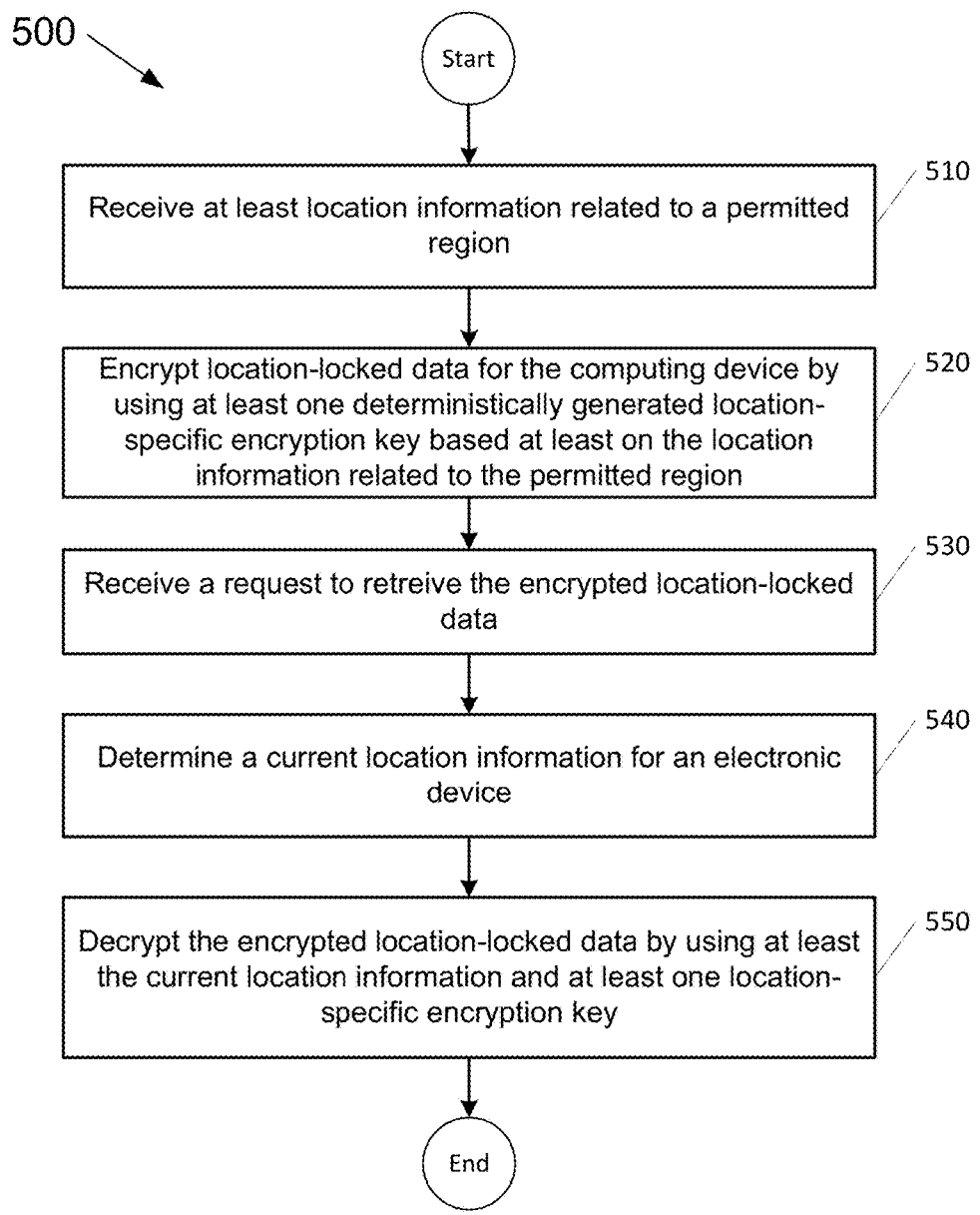
FIG. 8 illustrates a flow chart showing an example of a method for encrypting and decrypting location-locked data in accordance with an implementation of the present disclosure.

FIG. 8 illustrates a flow chart showing details of a method 500 for encrypting and decrypting location-locked data in accordance with an example implementation of the present disclosure. The method 500 may be executed with the encryption module 39 and the decryption module 40, where these modules are implemented with electronic circuitry used to carry out the functionality described below. It is to be understood that the method 500 may be implemented by the electronic device 10 of the system 5 or by any other similar electronic device in communication with a computing device (e.g., the device 15).

The method 500 begins at 510, where the electronic device 10 receives at least location information related to a permitted region. Block 510 may be similar to block 120 of the method 100. At 520, the device 10 encrypts location-locked data received from the computing device 15 by using at least one deterministically generated location-specific encryption key based at least on location information related to the permitted region. The techniques in block 520 may be similar to blocks 210-290 of the method 200, where the control unit 33 uses at least one location-specific encryption key to encrypt the location-locked data.

At 530, the electronic device 10 receives a request to retrieve the encrypted location-locked data (i.e., the received information is the original decrypted LLD). The request is similar to the request described in relation to block 310 of the method 200. In one example, the request may be received from the computing device 15 (e.g., a request for a password after a power outage for a computing device encrypted using full-disk encryption). In other examples, the request may be received from another device. The electronic device 10 then determines the current location information for the electronic device 10 (at 540). Block 540 may be similar to block 310 of the method 200, where the control unit receives or calculates the location of the device 15 by using various techniques. At 550, the electronic device 10 decrypts the encrypted location-locked data at the permitted region by using at least the current location information, the resolution, and at least one of the location-specific encryption keys. The techniques in block 560 may be similar to blocks 410-460 of the method 400.

Figure 9:
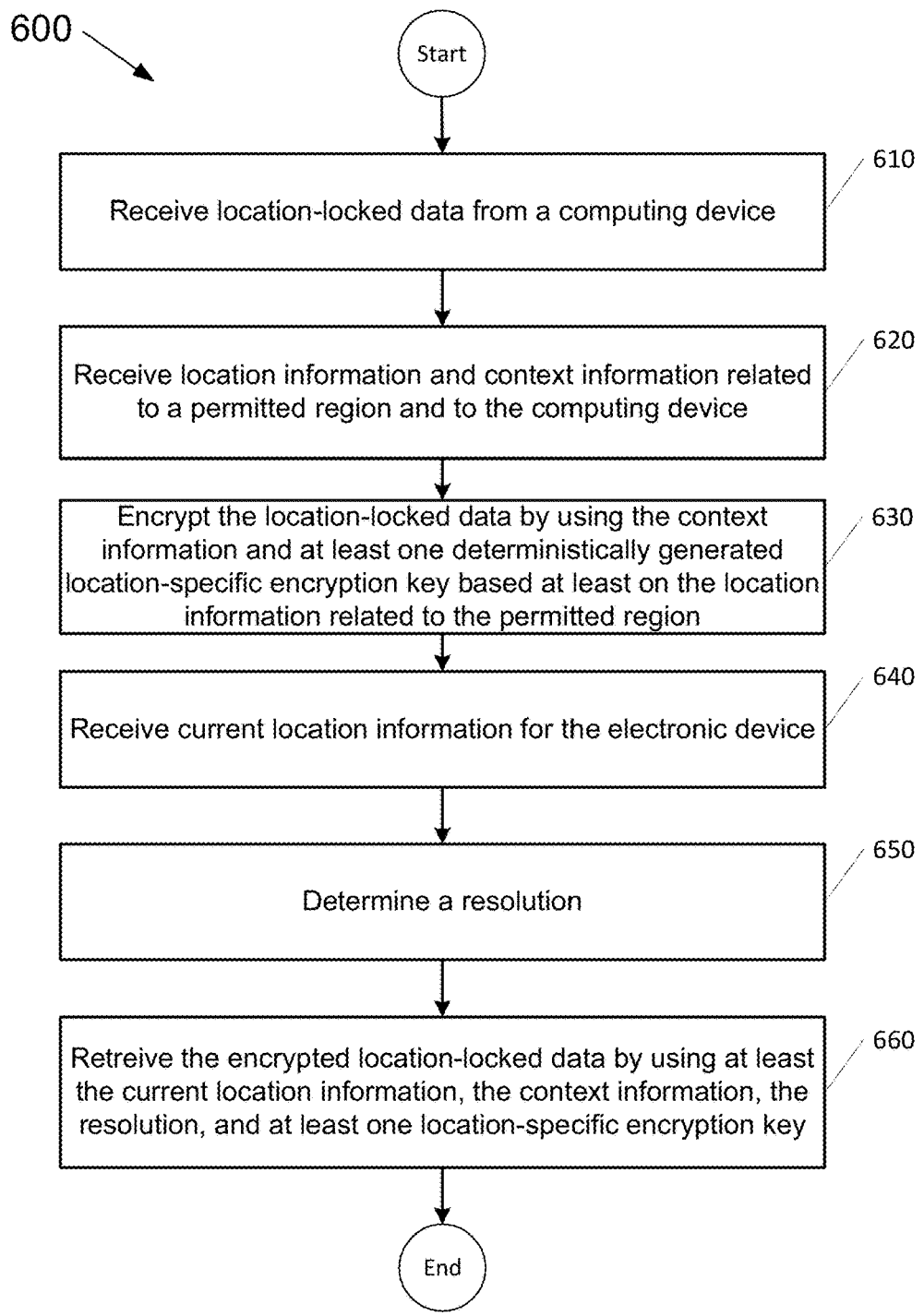
FIG. 9 illustrates a flow chart showing details of an alternative method for encrypting and decrypting location-locked data in accordance with an example implementation of the present disclosure.

FIG. 9 illustrates a flow chart showing details of an alternative method 600 for encrypting and decrypting location-locked data in accordance with an example implementation of the present disclosure. The method 600 may be executed in the form of instructions encoded on a non-transitory machine-readable storage medium 37 executable by the processor 30 of the electronic device 10. The method 300 may be executed with the encrypting module 39 and the decrypting module 40, where these modules are implemented in software.

The method 600 begins at 610, where the control unit 33 receives location-locked data from a computing device (e.g., the device 15). Block 610 may be similar to block 110 of the method 100. At 620, the control unit 33 receives location information and context information related to a permitted region and to the computing device 15. Block 620 may be similar to block 120 of the method 100. As mentioned above, in addition to the location information, the control unit may receive additional context information (e.g., time of day information, service set identifier (SSID) information, beacon value information, media access control (MAC) address information, serial number information, and challenge information, etc.).

At 630, the control unit 33 encrypts location-locked data for the computing device 15 encrypts the location-locked data by using the context information and at least one deterministically generated location-specific encryption key based at least on the location information related to the permitted region. The techniques in block 630 may be similar to blocks 210-290 of the method 200, where the control unit 33 uses location-specific encryption keys to encrypt the location-locked data.

At 640, the control unit 33 receives the current location information for the electronic device 10. In one example, the current location information may be received based on a request to decrypt the location-locked data (e.g., a request for a password after a power outage for a computing device encrypted using full-disk encryption). Block 640 may be similar to block 310 of the method 200, where the control unit receives or calculates the location of the device 15 by using various techniques.

Next, the control unit 33 determines a resolution (at 650). Block 650 may be similar to block 410 of the method 400. At 660, the control unit 33 decrypts the encrypted location-locked data for the computing device 15 by using at least the current location information, the context information, the resolution, and at least one location-specific encryption key. The techniques in block 660 may be similar to blocks 420-460 of the method 400.

What is claimed is:

1. A method comprising, by at least one processing device:
   receiving location-locked data (LLD);
   receiving location information related to a permitted region;
   deterministically generating at least one location-specific encryption key (LSK) based on data associated with a set of rounded location contexts, wherein generating includes:
      identifying a resolution;
      obtaining the set of rounded location contexts associated with the permitted region using the resolution and the location information for the permitted region; and
      generating an associated LSK based on data associated with each rounded location context from the set of rounded location contexts;
   encrypting the LLD such that the encrypted LLD is configured to be decrypted using the associated LSK;
   constructing a location-locked data record (LLDR) including at least the LLD;
   obtaining a data encryption key (DEK) and a data decryption key (DDK) for the LLD;
   encrypting the LLDR using the DEK to generate an encrypted location-locked data record (ELLDR);
   constructing a data decryption key record (DDKR) including the DDK;
   encrypting the DDKR using the associated LSK to generate at least one encrypted data decryption key record (EDDKR); and storing the at least one EDDKR.

2. The method of claim 1, further comprising deleting the at least one location-specific encryption key.

3. The method of claim 1, further comprising receiving additional context information related to the permitted region and to the processing device, the additional context information including at least one of: time of day information, service set identifier (SSID) information, beacon value information, media access control (MAC) address information, serial number information, and challenge information, wherein obtaining the set of rounded location contexts is based on the additional context information.

4. The method of claim 1, further comprising:
receiving a discriminator key corresponding to the LLD;
associating the discriminator key with the LLD when multiple instances of LLD are received; and
wherein the discriminator key is included in each rounded location context to generate the associated LSK.

5. The method of claim 1, wherein the set of rounded location contexts associated with the permitted region includes a single rounded location context.

6. The method of claim 1, wherein the resolution reflects a size of identified sub-regions used to determine rounded location contexts within the permitted region.

7. The method of claim 6, wherein the resolution further reflects a size of at least one identified sub-region outside the permitted region.

8. A method comprising:
receiving current location information for an electronic device;
deterministically generating at least one location-specific encryption key (LSK) based on the current location information;
using the at least one LSK as a decryption key to obtain location-locked data (LLD);
identifying a resolution;
determining a rounded location context for the electronic device based on the current location information and the resolution;
analyzing stored encrypted data decryption key records (EDDKR) to obtain the LLD, wherein generating the at least one LSK based on the current location comprises generating an associated LSK based on the rounded location context;
decrypting each EDDKR using the associated LSK to obtain a putative data decryption key record (PDDKR) containing a putative data decryption key (PDDK) for each EDDKR;
decrypting an encrypted location-locked data record (ELLDR) for the LLD using at least one identified PDDK to obtain a putative location-locked data record (PLLDR) containing a putative location-locked data (PLLD);
determining whether the identified PDDK represents the DDK and the associated LSK represents the correct LSK; and
returning the PLLD.

9. The method of claim 8, further comprising:
receiving a discriminator key corresponding to the LLD; and
using the discriminator key to obtain the LLD when multiple instances of LLD are encrypted.

10. The method of claim 8, further comprising:
receiving additional context information related to the permitted region and to the electronic device, the additional context information including at least one of: time of day information, service set identifier (SSID) information, beacon value information, media access control (MAC) address information, serial number information, and challenge information; and
computing the rounded location context using at least a portion of the additional context information.

11. The method of claim 8, wherein the resolution reflects a size of identified sub-regions used to determine rounded location contexts within the permitted region.

12. The method of claim 11, wherein the resolution further reflects a size of at least one identified sub-region outside the permitted region.

13. A system comprising:
an electronic device in communication with a computing device to receive location-locked data (LLD), the electronic device having at least one processing device with a control unit to:
receive at least location information related to a permitted region,
encrypt LLD from the computing device by using at least one deterministically generated location-specific encryption key (LSK) based at least on location information related to the permitted region,
receive a request to decrypt the encrypted LLD,
determine a current location information for the electronic device,
decrypt the encrypted LLD by using at least the current location information and the at least one LSK,
construct a location-locked data record (LLDR) including at least the LLD,
encrypt the LLDR using a data encryption key (DEK) to generate an encrypted location-locked data record (ELLDR),
construct a data decryption key record (DDKR) including a data decryption key (DDK),
identify a resolution, and
determine at least a set of rounded location contexts associated with the permitted region based on the resolution and the location information for the permitted region, where for each rounded location context the control unit is to:
generate an associated LSK,
encrypt the DDKR using the associated LSK to generate an encrypted data decryption key record (EDDKR), and
store the EDDKR.

14. The system of claim 13, the control unit further to:
compute a decrypting rounded location context for the electronic device based at least on the current location information and the resolution;
generate a decrypting LSK based on the decrypting rounded location context;
decrypt each EDDKR using the decrypting LSK to identify the DDK for the LLD;
decrypt the ELLDR for the LLD using an identified DDK;
return the LLD based on the decrypted LLDR.

15. A non-transitory machine-readable storage medium encoded with instructions executable by at least one processor of an electronic device, the machine-readable storage medium comprising instructions to:
receive location-locked data (LLD) from a computing device;
receive location information and context information related to a permitted region and to the computing device;
encrypt the LLD by using the context information and at least one deterministically generated location-specific encryption key (LSK) based at least on the location information related to the permitted region;
receive current location information for the electronic device;
determine a resolution for the computing device;
decrypt the encrypted LLD by using at least the current location information, the context information, the resolution, and at least one LSK;
construct a location-locked data record (LLDR) including at least the LLD;
encrypt the LLDR using a data encryption key (DEK) to generate an encrypted location-locked data record (ELLDR);
construct a data decryption key record (DDKR) including a data decryption key (DDK);
identify a resolution; and
determine at least a set of rounded location contexts associated with the permitted region based on the resolution and the location information for the permitted region, where for each rounded location context the at least one processor is to:
generate an associated LSK,
encrypt the DDKR using the associated LSK to generate an encrypted data decryption key record (EDDKR), and
store the EDDKR.

16. The non-transitory machine-readable storage medium of claim 15, wherein the resolution reflects a size of identified sub-regions used to determine rounded location contexts within the permitted region.

17. The non-transitory machine-readable storage medium of claim 16, wherein the resolution further reflects a size of at least one identified sub-region outside the permitted region.

* * * * *